Figure 5:
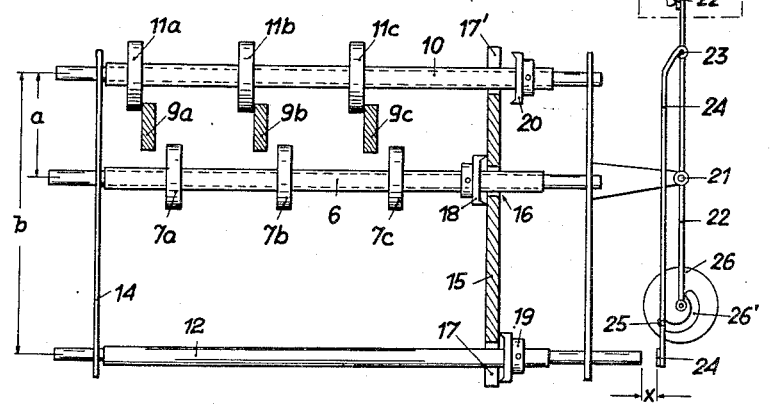

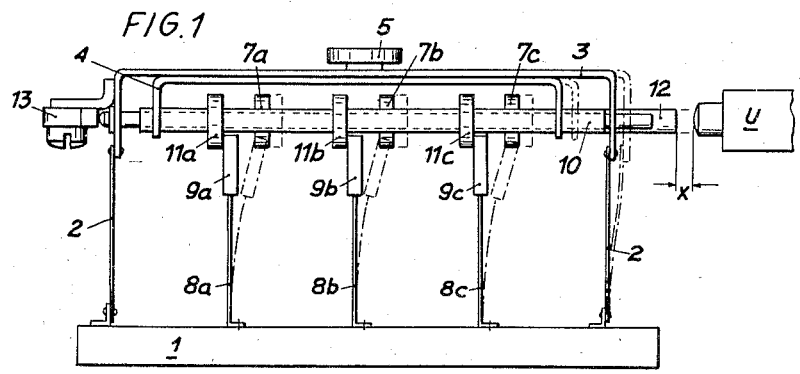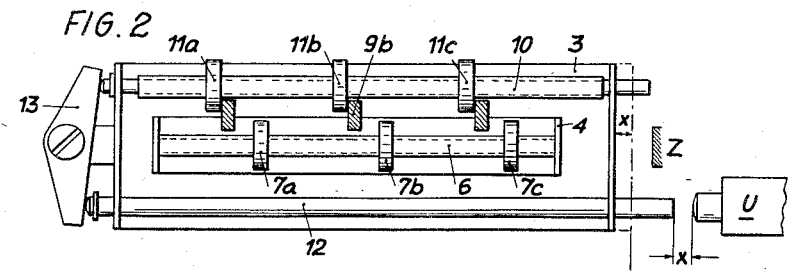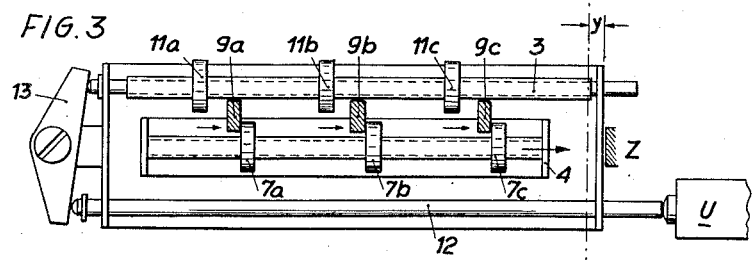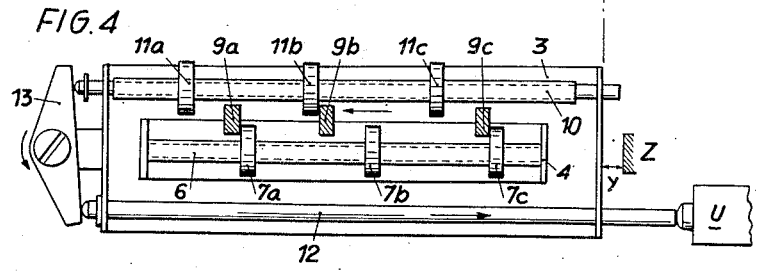

United States Patent Office 2,833,887
Patented May 6, 1958

2,833,887

TRIPPING DEVICE FOR CIRCUIT BREAKERS FOR THE PROTECTION OF POLYPHASE CIRCUITS AGAINST OVERCURRENT AND PHASE ASYMMETRY

Eduard Schrack, Vienna, Austria

Application October 5, 1955, Serial No. 538,568

Claims priority, application Austria December 23, 1954

12 Claims. (Cl. 200—116)

This invention relates to tripping devices for circuit breakers for the protection of polyphase circuits—particularly of squirrel cage motors—against overcurrent and phase asymmetry, more particularly to tripping devices of that kind in which the movement of current sensitive members associated with the respective phases, e. g. of relay armatures or heated bimetallic strips, is transmitted by means of two sets of transmitting stystems, which are arranged on both sides of the current sensitive members and cooperate therewith independently of each other, to a release member or switch locking device of any suitable type.

It is known that overcurrent tripping devices afford an insufficient protection for the motor in numerous operating conditions unless they are responsive also to phase asymmetry. For instance, where bimetallic strips are used in the supply conductors of a motor connected in delta, to be responsive to a limiting tripping current of 1.15–1.20 $I_n$, this will not prevent a single-phase overload of 30–35%. This leads often to a destruction of the winding. In many cases greatly underloaded or even idling motors which cannot start single-phase are damaged owing to the absence of the cooling action produced by them in operation. Where several motors cooperate the belated cutting-out of a single-phase operated motor, which cannot be automatically restarted in intermittent operation, may cause serious disturbances in operation.

As disclosed, e. g., in the Swiss Patent No. 275,946 and the British Patent No. 473,778, it has been suggested to construct tripping devices for motor-protective switches, which are responsive to symmetrical overloading and to phase asymmetry. In these known embodiments, however, the movement of the current sensing members which remain behind in the case of phase asymmetry is transmitted to the release member by a separate reversing lever for each current sensing member. The pivot bearings of said levers impair the reliability of operation. Moreover, these protective devices are necessarily responsive with the same sensitivity to symmetrical overload and to phase failure.

Compared to that prior art the invention provides a tripping device for protective switches, in which these disadvantages are avoided and the kinematic transmission system is designed to provide for mutually independent adjustments of the tripping sensitivities for both tripping conditions and different tripping periods, which are much shorter for phase asymmetry. It has been recognized that these measures are particularly important where such devices are used for separate protection requirements. In addition, the device according to the invention is constructed to the greatest extend from tried elements of construction, which are known, e. g., from the Austrian Patent No. 183,310.

Finally the invention is concerned with an additional device for setting the nominal tripping current, which device is adapted to the specific construction of the transmission system and enables an accurate adaptation to the nominal current of the respective motor, independently of the relation between the limiting tripping currents in the case of symmetrical overloading and phase asymmetry.

These objects are achieved according to the invention in a tripping device for a circuit breaker inserted in a polyphase circuit, said tripping device being responsive to overcurrent and phase asymmetry and comprising a plurality of current sensitive members each of which is responsive to one phase of said circuit, characterized by a frame, two abutment bars and one transmitting bar, said bars being parallel and carried by said frame for lengthwise movement relative to each other, two sets of abutments, each of said sets being affixed to one of said abutment bars and comprising a plurality of abutments each of which is operable by one of said current sensitive members, a single coupling lever directly or indirectly carried by one of said bars and in loose engagement with the other two bars and capable of a limited pivotal movement, and a release member operable by a predetermined movement of said transmitting bar to release said circuit breaker.

The abutments of one of said sets are operable by said current sensitive members in the case of overcurrent in said circuit to move the bar to which they are affixed in one direction, the abutments of the other of said sets are operable by said current sensitive members in the case of phase asymmetry in said circuit to move the bar to which they are affixed in the opposite direction relative to said bar having affixed thereto the stops responsive to overcurrent, and said lever is arranged to transmit either of said oppositely directed movements of said abutment bars to said transmitting bar as a movement which has the same direction in the case of either of said oppositely directed movement.

According to another feature of the invention the abutments responsive to symmetrical overloading and to phase asymmetry (single phasing and greatly asymmetrical loading), respectively, are axially adjustable on their tripping bars, which are suitably formed as screw spindles. This enables a separate adjustment of the tripping sensitivity.

Several variants for the construction of the tripping device for protective switchgear are provided according to the invention.

In the simplest case the common frame of the transmission system is longitudinally slidably arranged and the bar which carries the actuating stops responsive to asymmetrical overloading is affixed to the frame in a definite, though preferably adjustable relation during operation, whereas the two other bars are axially slidably inserted in the frame.

In another particularly advantageous embodiment of the invention the common frame of the transmission system is stationary and all three tripping bars—those carrying the actuating stops as well as the transmitting bar—are axially slidably arranged; the coupling lever is preferably carried on the intermediate bar with a radial clearance and embraces the two outer bars with longitudinal slots and cooperates with all three tripping bars by means of collars affixed to them.

Two suitable embodiments of electrical tripping devices for a three-phase overcurrent automatic switch are shown on the accompanying drawings in both tripping conditions in different phases of operation.

Figs. 1 and 2 show a simple tripping device in a relieved inoperative position, with cold current sensing members (8a–c), as seen from the side and from below, respectively.

Figs. 3 and 4 show both operative positions of the device as viewed from below. Fig. 3 shows the device at the time of tripping in response to symmetrical overloading—parallel advance of all three current sensitive members (8/9a–c). Fig. 4 shows the tripping in the case of single phasing or highly asymmetrical loading, when one of the three current sensitive members (9b) remains cold, remains back, or moves back quickly relative to the two other current sensitive devices (9a and c).

Figs. 5–10 show an improved construction of the tripping device, having an extremely shortened tripping period for phase asymmetry, in different phases of operation.

Figure 6:
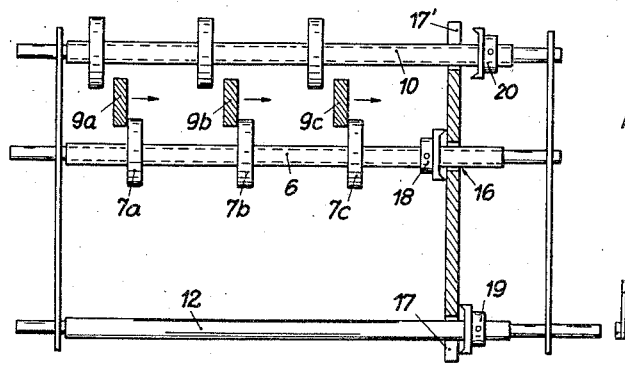
Figure 7:
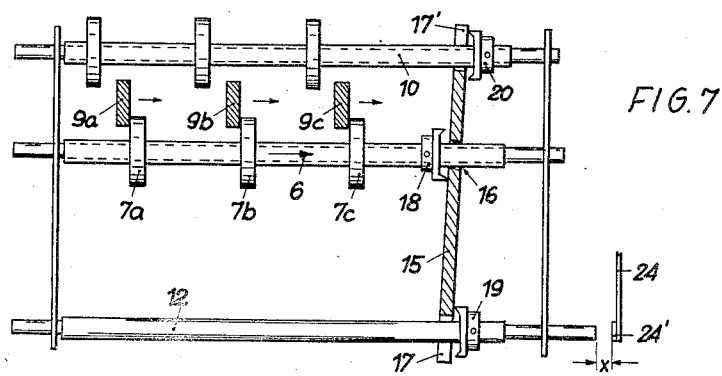
Figure 8:
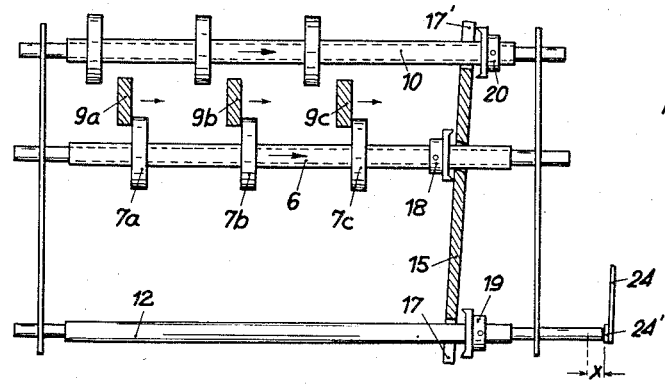
Figure 9:
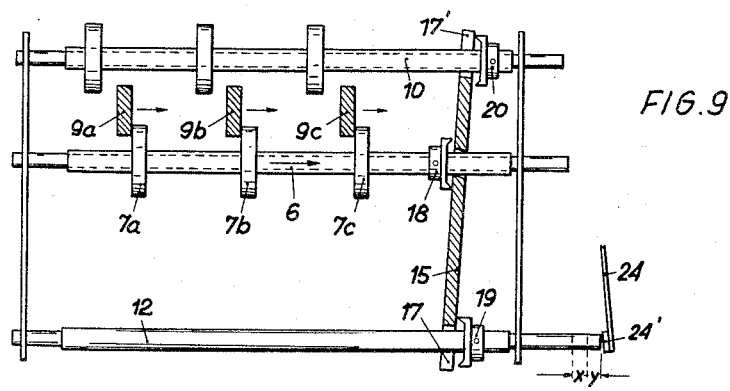
Figure 10:
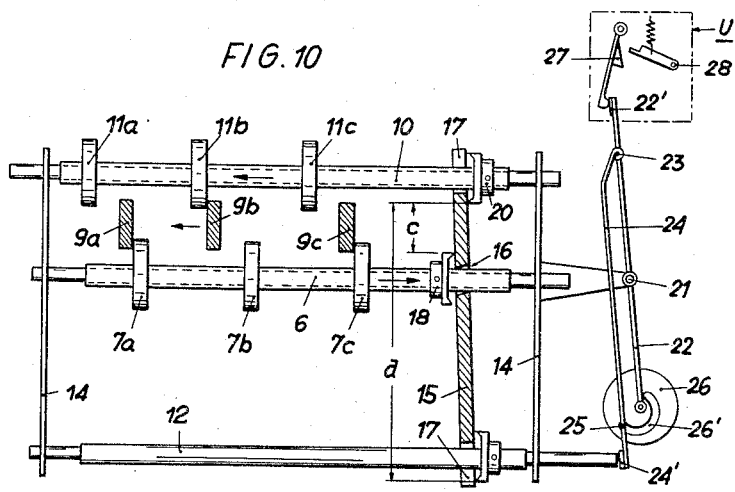

Fig. 5 shows the device in its inoperative, relieved position. Figs. 6, 7 and 8 show the starting operation in two intermediate positions and in the final position, with current sensitive members (8–9) loaded by the nominal current. Figs. 9 and 10 show the device at the time of tripping in the two tripping conditions analogous to Figs. 3 and 4.

Figs. 5 and 10 show also the device for setting the nominal tripping current with the release member switched on and off, respectively.

In the tripping device shown in Figs. 1–4 the tripping bridge consisting of the bail-shaped frame 3 and the stop carrier 4 is resiliently, longitudinally slidably affixed with two springs 2 and without bearings to the ceramic base plate 1. The carrier 4 has riveted into it a threaded bolt 6, which carries three overcurrent tripping abutments 7a, 7b and 7c, which are adjustable for a uniform phase setting but remain in position relative to the bridge 3—4 during operation. Both bridge parts 3 and 4 are coupled to each other but can be moved lengthwise of each other by means of the setting disc 5, whereby the nominal tripping current can be adapted to the respective nominal current of the motor. The base plate 1 has also affixed thereto, at terminals not shown here, three current sensitive members consisting in the present case of bimetallic strips 8a, 8b and 8c, which carry at their ends ceramic mountings 9a–c, which cooperate with the said abutments 7a–c.

In the operation of the tripping device all three bimetallic strips 8a–c deflect, as is indicated with dash-and-dot lines in Fig. 1, to such an extent that when they have reached the corresponding overcurrent tripping abutments 7a–c they move the same and with them the entire bridge, with the push bar 12 affixed thereto, by the distance x until the push bar 12 engages the release member U. As has been mentioned that release member may be of any suitable type, e. g. a switch contact, a pawl locking a spring-loaded shaft against rotation, or the like.

In the case of all-phase overloading illustrated in Fig. 3, the pressure exercised by all three bimetallic strips 8a–c on the overcurrents stops 7a–c causes the entire tripping bridge 3—4 with the push bar 12 to move farther left by the distance y, whereby the release member is actuated. This function is made clear in Figs. 2–4 by a reference edge Z shown beside the tripping bridge. As far as described hereinbefore the operation agrees with that of known overcurrent tripping devices.

To cause an immediate breaking of the load circuit in the case of a decrease or failure of current in at least one phase—so-called single phasing—the following additional device is provided according to the invention. A threaded bar 10 is formed with reduced ends carried in the frame 3 of the tripping bridge. The bar 10 is parallel to the frame 3 and is longitudinally movable relative thereto in a limited range. The bar 10 carries three, preferably adjustable abutments 11a, 11b and 11c, which cooperate also with the bimetallic strips 8a–c and serve to cause tripping in the case of undercurrent in at least one phase. The overcurrent abutments 7a–c and the undercurrent abutments 11a–c lie on mutually opposite sides of the ceramic mountings 9a–c, which engage the abutments 11a–c only as they return towards the inoperative position or remain in the same, i. e. only when at least one bimetallic strip 8 cools down. Thus the bar 10 is urged to the left. Opposite to said bar 10 the frame 3 carries a longitudinally movable push bar 12. The carrier 10 of the undercurrent abutments 11a–c is kinematically coupled to said push bar 12 by means of a two-armed lever 13 carried at the left-hand end of the frame 3. In the two critical tripping conditions this kinematic connection causes the following movements: In the case of overcurrent (Fig. 3) the push bar 12, being supported on the coupling lever 13, follows the movement of the entire tripping bridge 3—4. Fig. 4 indicates that in the case of single phasing the counterpressure of a single returning bimetallic strip—here the intermediate one 8–9b—on the associated undercurrent abutment 11b is sufficient to move the abutment carrier 10 to the left, whereby the coupling lever 13 is caused to move the push bar 12 to the right relative to the stationary tripping bridge 3—4, which has been displaced only by the distance x into the normal operating position, shown with dash-and-dot lines in Fig. 1. The push bar 12 is moved to the right by the same distance y as in the case of Fig. 3 until it has operated the release member U.

Figs. 5 to 10 show a preferred embodiment of the switchgear tripping device according to the invention. In this tripping device the transmission system consists of a stationary frame 14, in which both abutment carriers 6 and 10 formed as screw spindles and the bar 12, which actuates the release member U, are longitudinally displaceably arranged. The bar 12 is suitably arranged at a larger distance from the first-mentioned abutment carrier 6 than the bar 10. As in the first embodiment the intermediate tripping bar 6 carries the adjustable abutments 7a–c, which are simultaneously actuated by the three current sensitive members 9a–c in the case of symmetrical overloading. The abutments 11a–c, which are arranged on the other side of the three current sensitive members 9a–c and are responsive to single phasing or asymmetrical loading, are adjustably carried on the upper tripping bar 10.

The coupling lever 15, which cooperates in certain conditions with the three tripping bars, has a bore 16 of sufficient width to mount the lever 15 with play on the intermediate stop carried 6. The lever 15 has longitudinal slots 17 and 17' receiving the two outer tripping rods 12 and 10 and is arranged between three collars 18, 19 and 20, which are fixed on the tripping bars on alternating sides of the coupling lever.

In the inoperative position, shown in Fig. 5, all three tripping bars 6, 12 and 10 are substantially in engagement with the left-hand frame member 14, and the cold current sensitive members 9a–c, which are duly spaced from the overcurrent abutments 7a–c, are in substantial engagement with the abutments 11a–c of the upper tripping bar 10. The coupling lever 15 has a small axial play between the collars 18, 19 and 20 of the tripping bars. The tripping bar 12 is spaced by the distance x from the stop 24' of the release member U, which is in locking position.

The following mode of operation results when the motor or the like which is protected by the tripping device is switched on.

(1) When the lead device is started to its nominal current the transmission system of the tripping device moves through the two intermediate positions shown in Figs. 6 and 7 into the normal operating position shown in Fig. 8. The current sensitive members 9a–c are deflected to the right under the action of the rising temperaure and reach first the abutments 7a–c of the intermediate tripping bar (Fig. 6). They advance the bar 6 by a small distance until the coupling lever 15, which is now supported on both outer collars 19 and 20, is canted with its bore 16 on the intermediate tripping bar 6. The canted coupling lever 15 will then move all three tripping bars parallel to each other by the amount x until the current sensing members 9a–c have reached their final position, in which the tripping bar 12 just engages the stop 24' of the adjusting device which is coupled to the release member U (Fig. 8).

(2) In the case of all-phase overloading the situation shown in Fig. 9 is obtained: Under the action of the intermediate tripping bar 6, which is driven by all three current sensing members in the tripping direction, the coupling lever 15 and with it the tripping bar 12 engaging the lever 15 with its collar 19 are farther advanced by the distance y, whereby the lever 24 is actuated to trip the release member U. During that operation the upper tripping bar 10 follows the movement without function. Thus the movement of the current sensitive members 9 is transmitted at a ratio of 1:1 to the tripping bar 12 in the case of all-phase overloading.

(3) Fig. 10 shows the operation in the case of single phasing or highly asymmetrical loading. It is assumed that the currentless current sensing member 9b moves back sufficiently to engage the associated abutment 11b on the upper tripping bar 10 or that in the case of a single-phase start said member 9b remains in its initial position. Now the upper tripping bar 10 becomes operative. The engagement of its collar 20 at the upper end (17) of the coupling lever 15 provides a new fulcrum for the coupling lever 15, which acts now as a one-armed transmission lever. The relative displacement of the loaded current sensitive members 9a, and 9c relative to the one remaining back (9b) is transmitted with a correspondingly large ratio $c:d$ to the tripping bar 12, whereby the tripping time is much reduced compared to the one in the case of symmetrical overloading.

With this design according to the invention the transmission ratio $c:d$ can be chosen to provide for such a tripping sensitivity that tripping will occur in the case of phase failure even if a nominal current or less than the nominal current flows in the properly working phases. On the other hand it is possible to set the device for tripping at a higher limiting current in the case of single phasing by setting the abutments 11a–c by an appropriate distance to the left.

Figs. 5 and 10 show the linkage for setting the nominal tripping current during operation. This linkage is disposed between the tripping bar 12 and the release member, which is here shown to consist of a switch locking device U. According to the invention the linkage comprises a two-armed lever 22, which is pivoted to the stationary frame 14 at 21. The lever 22 engages with one end 22' the locking pawl 27 of the switch lever 28 and carries at the other end an adjustable disc 26 formed with a spirally shaped guide slot 26'. The linkage further comprises a one-armed lever 24 pivoted to the two-armed lever 22 near its end at 23. The free end 24' of the one-armed lever 24 has a projection 25 guided in the guide slot 26' of the guide disc 26 and engages the tripping bar 12. Both levers, which are thus positively coupled, may be spread more or less apart by an appropriate turning of the guide disc 26. Thus the stop 24' disposed at the end of the one-armed lever 24 may be set at such a distance from the end of the transmitting bar 12 that the remaining travel of the transmitting bar corresponds to the desired nominal tripping current.

This design according to the invention affords actually the numerous technical and economical advantages which have been expected.

(1) The arrangement of a single coupling lever 13 or 15 for reversing the oppositely directed undercurrent tripping movements to the pushing direction of the transmitting bar 12 reduces the number of pivot bearings, which are undesired in switchgear construction, to a single one or enables such bearings to be avoided entirely.

(2) The direct mounting of this lever on the frame 3 of the slidable tripping bridge, more particularly on the intermediate carrying bar 6 of said bridge, provides for a uniform tripping accuracy in the case of phase asymmetry, independently of the instantaneous operating condition. This is of the greatest importance for the protection of the connected load devices.

(3) The very important independent adjustability of both sets of stops for the tripping in the case of all-phase overloading, on the one hand, or of single phasing or highly asymmetrical overloading on the other hand. The tripping limit current can be selectively adjusted to be lower in one of said cases than in the other one by a corresponding adjustment of the abutments 7a–c and 11a–c, respectively, on their carrying spindles 6 and 10.

(4) The transmission ratio $c:d$ of the coupling lever 13 or 15 can be selected to provide for a corresponding decrease of the tripping sensitivity and for a great reduction of the tripping delay in the case of phase asymmetry so that tripping occurs in the case of phase failure even if the nominal current or less than the nominal current flows in the intact phases.

(5) The entire device according to the invention consists mainly of elements which have proved durable in operation for a long time.

What I claim is:

1. A tripping device for a circuit breaker inserted in a polyphase circuit, said tripping device being responsive to overcurrent and phase asymmetry and comprising a plurality of current sensitive members each of which is responsive to one phase of said circuit, a frame, two abutment bars and one transmitting bar, said bars being parallel and carried by said frame for lengthwise movement relative to each other, two sets of abutments, each of said sets being affixed to one of said abutment bars and comprising a plurality of abutments each of which is operable by one of said current sensitive members, a single coupling lever carried by one of said bars in loose engagement with the other two bars and capable of a limited pivotal movement, and a release member operable by a predetermined movement of said transmitting bar to release said circuit breaker.

2. A tripping device as set forth in claim 1, in which said coupling lever is directly carried by said one bar.

3. A tripping device as set forth in claim 1, in which said coupling lever is indirectly carried by said one bar.

4. A tripping device for a circuit breaker inserted in a polyphase circuit, said tripping device being responsive to overcurrent and phase asymmetry and comprising a plurality of current sensitive members each of which is responsive to one phase of said circuit, a frame, two abutment bars and one transmitting bar, said bars being parallel and carried by said frame for lengthwise movement relative to each other, two sets of abutments, each of said sets of abutments being affixed to one of said abutment bars and comprising a plurality of abutments each of which is operable by one of said current sensitive members, the abutments of one of said sets being operable by said current sensitive members in the case of overcurrent in said circuit to move the bar to which they are affixed in one direction, the abutments of the other of said sets being operable by said current sensitive members in the case of phase asymmetry in said circuit to move the bar to which they are affixed in the opposite direction relative to said bar having affixed thereto the abutments responsive to overcurrent, a single coupling lever carried by one of said bars and in loose engagement with the other two bars and capable of a limited pivotal movement, said lever being arranged to transmit either of said oppositely directed movements of said abutment bars to said transmitting bar as a movement which has the same direction in the case of either of said oppositely directed movements, and a release member arranged to be operable by a predetermined amount of said movement of said transmitting bar to release said circuit breaker.

5. A tripping device as set forth in claim 4, in which said stops are adjustably affixed to said stop-carrying bars.

6. A tripping device as set forth in claim 4, in which said stop-carrying bars are screw spindles and said stops are screw-threaded on said bars.

7. A tripping device for a circuit breaker inserted in a polyphase circuit, said tripping device being responsive to overcurrent and phase asymmetry and comprising a plurality of current sensitive members each of which is responsive to one phase of said circuit, a longitudinally movable frame, two abutment bars and one transmitting bar, said bars being parallel and carried by said frame for lengthwise movement relative to each other, two sets of stops, each of said sets of abutments being affixed to one of said abutment bars and comprising a plurality of stops each of which is operable by one of said current sensitive members, the abutments of one of said sets being operable by said current sensitive members in the case of overcurrent in said circuit to move the bar to which they are affixed in one direction, the abutments of the other of said sets being operable by said current sensitive members in the case of phase asymmetry in said circuit to move the bar to which they are affixed in the opposite direction relative to said bar having affixed thereto the abutments responsive to overcurrent, the bar having affixed thereto said stops responsive to overcurrent being affixed to and the other two bars being slidably carried by said frame, a single coupling lever carried by one of said bars and in loose engagement with the other two bars and capable of a limited pivotal movement, said lever being arranged to transmit either of said oppositely directed movements of said abutment bars to said transmitting bar as a movement which has the same direction in the case of either of said oppositely directed movements, and a release member arranged to be operable by a predetermined amount of said movement of said transmitting bar to release said circuit breaker.

8. A tripping device for a circuit breaker inserted in a polyphase circuit, said tripping device being responsive to overcurrent and phase asymmetry and comprising a plurality of current sensitive members each of which is responsive to one phase of said circuit, a stationary frame, two abutment bars and one transmitting bar, said bars being parallel and axially slidably carried by said frame for lengthwise movement relative to each other, two sets of abutments, each of said sets of abutments being affixed to one of said abutment bars and comprising a plurality of abutments each of which is operable by one of said current sensitive members, a single coupling lever carried by one of said bars and in loose engagement with the other two bars and capable of a limited pivotal movement, and a release member arranged to be operable by a predetermined movement of said transmitting bar to release said circuit breaker.

9. A tripping device for a circuit breaker inserted in a polyphase circuit, said tripping device being responsive to over-current and phase asymmetry and comprising a plurality of current sensitive members each of which is responsive to one phase of said circuit, a frame, two abutment bars and one transmitting bar, said bars being parallel and carried by said frame for lengthwise movement relative to each other, said bars comprising an intermediate bar and two other bars, two sets of abutments, each of said sets of abutments being affixed to one of said abutment bars and comprising a plurality of abutments each of which is operable by one of said current sensitive members, the abutments of one of said sets being operable by said current sensing members in the case of overcurrent in said circuit to move the bar to which they are affixed in one direction, the abutments of the other of said sets being operable by said current senitive members in the case of phase asymmetry in said circuit to move the bar to which they are affixed in the opposite direction relative to said bar having affixed thereto the abutments responsive to overcurrent, a single coupling lever formed with an intermediate aperture whereby it is carried with radial play on said intermediate bar, and with two longitudinal slots receiving said outer bars, three collars, each of which is affixed to one of said bars for cooperation with said lever, said lever being in loose engagement with said collars on said outer bars and capable of a limited pivotal movement and being arranged to transmit either of said oppositely directed movements of said abutment bars to said transmitting bar as a movement which has the same direction in the case of either of said oppositely directed movements, and a release member arranged to be operable by a predetermined amount of said movement of said transmitting bar to release said circuit breaker.

10. A tripping device as set forth in claim 9, in which the bar having affixed thereto the abutments responsive to overcurrent is movable to cant said lever in said aperture and in which said lever when thus canted is adapted to rigidly couple said bar having affixed thereto the abutments responsive to overcurrent to said transmitting bar for simultaneous movement.

11. A tripping device as set forth in claim 9, in which said abutment bar responsive to phase asymmetry constitutes an outer bar and said bar having affixed thereto the abutments responsive to overcurrent constitutes said intermediate bar, the collar affixed to said bar having affixed thereto the abutments responsive to phase asymmetry being adapted to form a fulcrum for said lever in the case of movement of the bar having affixed thereto the abutments responsive to phase asymmetry in said opposite direction relative to the other abutment bar, whereby said lever is caused to transmit said relative movement with a high transmission ratio to said transmitting bar, said bars having a center spacing selected to provide for a much shorter tripping delay in the case of phase asymmetry than in the case of a comparable symmetrical overcurrent.

12. A tripping device for a circuit breaker inserted in a polyphase circuit, said tripping device being responsive to overcurrent and phase asymmetry and comprising a plurality of current sensitive members each of which is responsive to one phase of said circuit, a stationary frame, two abutment bars and one transmitting bar, said bars being parallel and axially slidably carried by said frame for lengthwise movement relative to each other, two sets of abutments, each of said sets of abutments being affixed to one of said abutment bars and comprising a plurality of abutments each of which is operable by one of said current sensitive member, a single coupling lever carried by one of said bars and in loose engagement with the other two bars and capable of a limited pivotal movement, a locking pawl arranged to be operable by a predetermined movement of said transmitting bar to release said circuit breaker, and a linkage interposed between said transmitting rod and locking pawl and adjustable to select the tripping current, said linkage comprising a two-armed lever carried by said frame and having one end engaging said locking pawl, a disk adjustably carried by the other end of said two-armed lever, and formed with a guide slot, and a one-armed lever having one end linked to said two-armed lever and another end engaging said transmitting bar, said one-armed lever being provided adjacent to said other end with a projection guided in said guide slot.

References Cited in the file of this patent

UNITED STATES PATENTS 2,749,407    Walton _____ June 5, 1956

FOREIGN PATENTS 473,778    Great Britain _____ Oct. 20, 1937